United States Patent
Rodriguez Bravo et al.

(10) Patent No.: US 11,270,119 B2
(45) Date of Patent: Mar. 8, 2022

(54) VIDEO PRIVACY USING MACHINE LEARNING

(71) Applicant: KYNDRYL, INC., New York, NY (US)

(72) Inventors: Cesar Augusto Rodriguez Bravo, Alajuela (CR); Craig M. Trim, Ventura, CA (US); Jeremy R. Fox, Georgetown, TX (US); Zachary A. Silverstein, Austin, TX (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/527,084

(22) Filed: Jul. 31, 2019

(65) Prior Publication Data

US 2021/0034876 A1 Feb. 4, 2021

(51) Int. Cl.
*G06K 9/00* (2006.01)
*H04N 5/232* (2006.01)
*G06K 9/62* (2006.01)
*H04N 21/4545* (2011.01)
*H04N 21/4223* (2011.01)
*H04N 21/44* (2011.01)
*H04N 21/2187* (2011.01)

(52) U.S. Cl.
CPC ....... *G06K 9/00718* (2013.01); *G06K 9/6201* (2013.01); *H04N 5/23229* (2013.01); *H04N 21/2187* (2013.01); *H04N 21/4223* (2013.01); *H04N 21/44008* (2013.01); *H04N 21/45455* (2013.01)

(58) Field of Classification Search
CPC ............ G06K 9/00718; G06K 9/6201; H04N 5/23229; H04N 21/4223; H04N 21/44008; H05N 21/2187; H05N 21/45455
See application file for complete search history.

(56) References Cited

U.S. PATENT DOCUMENTS

| | | |
|---|---|---|
| 8,189,866 B1 | 5/2012 | Gu et al. |
| 9,323,983 B2 | 4/2016 | Monnerat et al. |
| 10,580,149 B1* | 3/2020 | Lakshminarayanan ...................... H04N 5/23203 |
| 10,657,373 B2* | 5/2020 | Wexler ............... H04N 1/00342 |
| 2007/0153091 A1 | 7/2007 | Watlington et al. |
| 2009/0295911 A1 | 12/2009 | Grim, III et al. |

(Continued)

OTHER PUBLICATIONS

Kitahara et al., "Stealth vision for protecting privacy", Proceedings of the 17th International Conference on Pattern Recognition, 2004, ICPR 2004, Cambridge, 2004, vol. 4, 4 pages.

(Continued)

*Primary Examiner* — Amy R Hsu
(74) *Attorney, Agent, or Firm* — Ken Han; Andrew M. Calderon; Roberts Calderon Safran & Cole P.C.

(57) ABSTRACT

A method, system and computer program product for providing video privacy is provided herein. First video data captured by a video camera is received. A context for the first video data is determined. It is determined that the context matches a privacy context from a set of privacy contexts identified using machine learning. In response to the context matching the privacy context, at least a portion of second video data is blocked that is captured by the video camera subsequent to the first video data.

17 Claims, 7 Drawing Sheets

(56) References Cited

U.S. PATENT DOCUMENTS

| | | | | |
|---|---|---|---|---|
| 2012/0075464 | A1* | 3/2012 | Derenne | A61B 5/0013 |
| | | | | 348/135 |
| 2013/0190903 | A1 | 7/2013 | Balakrishnan et al. | |
| 2015/0242638 | A1 | 8/2015 | Bitran et al. | |
| 2015/0296170 | A1* | 10/2015 | Farrell | G06K 9/52 |
| | | | | 386/254 |
| 2016/0100046 | A1 | 4/2016 | Meru et al. | |
| 2017/0192401 | A1* | 7/2017 | Wexler | G06K 9/00671 |
| 2019/0279765 | A1* | 9/2019 | Giataganas | G16H 10/60 |

OTHER PUBLICATIONS

Krombholz et al., "Ok Glass, Leave Me Alone: Towards a Systematization of Privacy Enhancing Technologies for Wearable Computing", Financial Cryptography and Data Security, FC 2015, Lecture Notes in Computer Science, vol. 8976, Springer, Berlin, Heidelberg (2015), 6 pages.

Anonymous, "Method and System for Controlling Privacy during Audio/Video Recording", IP.com Disclosure No. IPCOM000237663D, Publication Date: Jul. 2, 2014, 2 pages.

Lepetit et al., "Handling Occlusion in Augmented Reality Systems: A Semi-Automatic Method", Conference Paper, IEEE and ACM International Symposium on Augmented Reality, Feb. 2000, 10 pages, https://icwww.epfl.ch/%7Elepetit/papers/lepetit_isar00.pdf.

"A Semi-Automatic Method for Resolving Occlusions in Augmented Reality", https://members.loria.fr/MOBerger/lepetit/Occlusions/index.html, 5 pages, printed Mar. 20, 2019.

Berger et al., "Resolving Occlusion in Augmented Reality : a Contour Based Approach without 3D Reconstruction", Proceedings of IEEE Computer Society Conference on Computer Vision and Pattern Recognition, Jun. 1997, 6 pages.

\* cited by examiner

VIDEO PRIVACY USING MACHINE LEARNING

BACKGROUND

The present disclosure relates to augmented reality environments, and more specifically, to enhancing privacy in augmented reality environments using machine learning.

Video livestreaming and augmented reality technologies permit users to share and enhance their everyday lives. The field of use for these technologies is rapidly expanding from specialized platforms to incorporating elements of the technology into existing platforms ranging from gaming systems to business and industrial networks.

SUMMARY

According to embodiments of the present disclosure, a method for providing video privacy is provided herein. First video data captured by a video camera is received. A context for the first video data is determined. It is determined that the context matches a privacy context from a set of privacy contexts identified using machine learning. In response to the context matching the privacy context, at least a portion of second video data is blocked that is captured by the video camera subsequent to the first video data. Further disclosed herein are a computer program product and a system for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
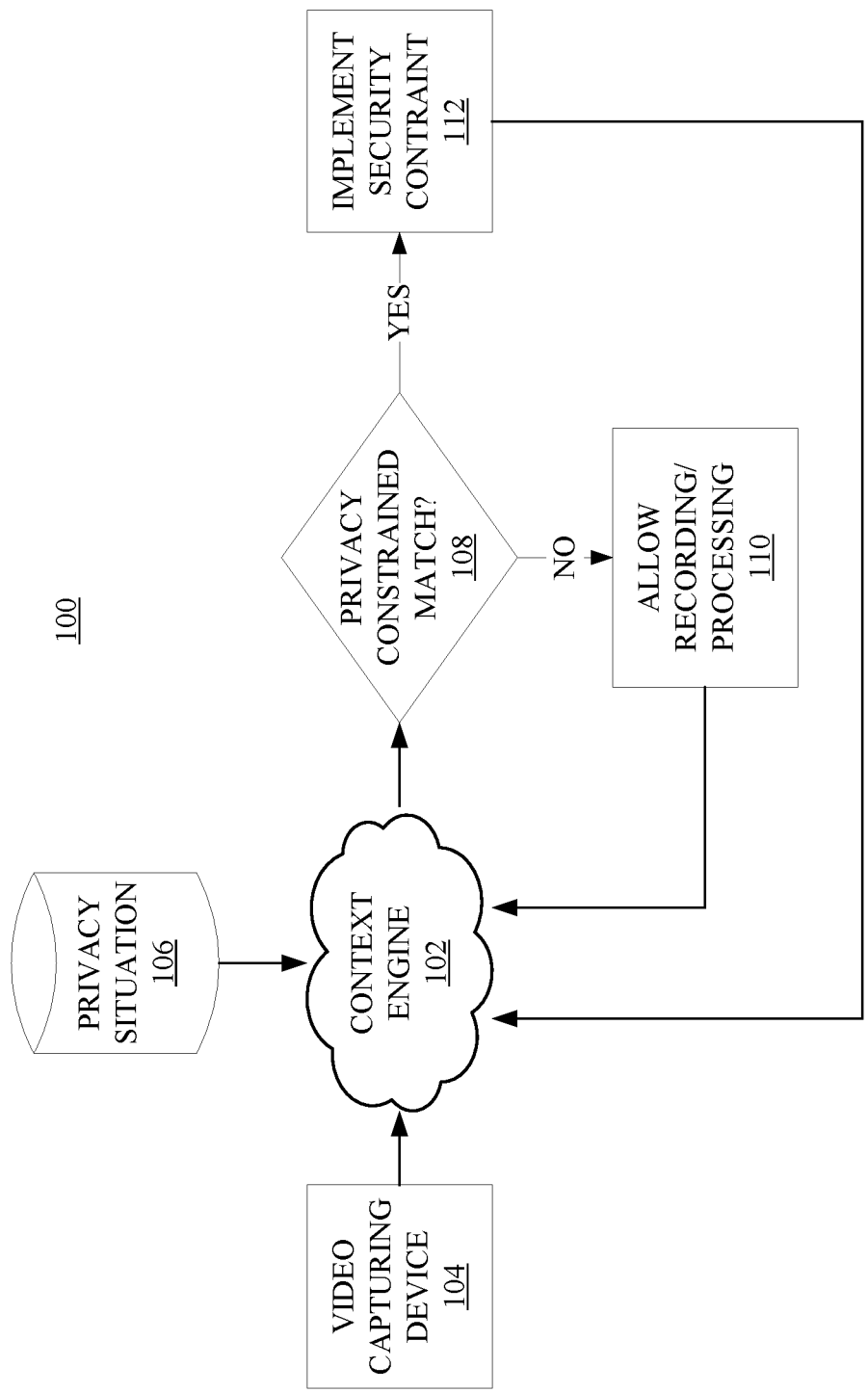
FIG. 1 depicts a flow diagram of an example operation of a context determining engine, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to augmented reality and livestreaming, and more particular aspects relate to enhancing privacy protections in augmented reality and livestreaming environments using machine learning. While the present disclosure is not necessarily limited to such applications, various aspects of the disclosure may be appreciated through a discussion of various examples using this context.

As livestreaming and augmented reality become increasingly prevalent in modern life, it becomes equally important to ensure the privacy of both the subjects of the video content and collaterally included persons and materials. Given the overwhelming amount of data generated during a livestream, sifting through it in real-time to determine whether privacy risks exist and acting quickly enough to ensure protection presents a challenge ill-suited to traditional methods of manually defining criteria to be excluded. By leveraging advanced machine learning techniques, the present disclosure provides for an enhanced real-time privacy protection in augmented reality (AR) and livestreaming environments.

The present disclosure is directed to a method and system for providing privacy in a video stream by continuously monitoring a captured dataset in real-time to permit dynamic analysis of privacy needs and application of appropriate obfuscation of sensitive portions of the dataset.

A context engine may determine a context for the captured data. The context engine may refer to a number of sources when assembling context builds and apply various machine learning techniques. The context engine may use a supervised or semi-supervise learning mode, built around privacy tags and/or labels applied by the user. In some embodiments, tags can be applied manually. For example, the user may tag certain visual objects via a user interface of an AR device. In some embodiments, tags may be inferred from contexts in which the user turned off recording/processing and the associated geolocation, manner, time/date, audio cues, etc. that make up the context. Tags may also be acquired through crowdsourcing to build global recommendations of privacy cues and contexts. In embodiments, the group-based labeling may be optional or integrated. For example, firms, companies, or other business or groups may develop their own group specific tags/cues/labels of data to be protected. Some organizations may have privacy concerns better, or necessarily, managed at a group rather than an individual level. Context may encompass a wide array of streaming dataset features, which may be user- or group-specific, or system determined depending on particular user needs and expectations. In embodiments, context may include, but is not limited to, visual (video) cues, audio cues, geotagging, time limits or settings, haptic responses, physical (e.g., RFID, NFC) or digital (e.g., metadata) tagging, etc.

A privacy engine may determine a data processing execution, such as blocking, unblocking, or running the stream uninhibited, according to the context. Blocking may involve stopping the recording or streaming of data to external devices, or may include applying filters, overlays, or other obfuscation tools to protect potentially sensitive data.

Referring now to FIG. 1, a flow diagram 100 presents an example operation of a context determining engine according to embodiments of the present disclosure. A context engine 102, or a context processor in embodiments, receives input from a video capturing device 104. The video capturing device 104 may be a video camera or a computing device in communication with a video camera. In some embodiments, video capturing device 104 is part an augmented reality (AR) device. The data provided by video capturing device 104 may include an augmented reality environment with AR processing of captured video or may include captured video without AR processing. Context engine 102 may be in communication with video capturing device 104 over a network. In other embodiments, context engine 102 is integrated within video capturing device 104. In addition to video data, video capturing device 104 may provide input data of any combination of a variety of data types. For example, input data may further include audio, movement, location, etc. This data may be captured by various devices that are either part of video capturing device 104 or in communication with video capturing device 104. Example devices associated with video capturing device 104 may include microphones, movement sensors such as gyroscopes and accelerometers, location sensors such as GPS, and tag reading devices such as RFID readers or other wireless communication devices. Audio data may be analyzed using voice recognition technology or other processing to extract features from the audio data.

The context engine 102 may use a privacy situation database 106 to determine whether the input from the video capturing device 104 represents a privacy constrained match 108. The privacy situation database 106 may be local or remote, or incorporate multiple elements some of which may local and others remote, and may include both user-specific and global privacy situations. If the input does not represent a privacy constrained match, recording and processing 110 of the input from the video capturing device 104 may be permitted and the context engine 102 may resume monitoring the input. In livestreaming environments, processing may include communicating the input over one or more networks for livestreaming of the video data to one or more external systems. For AR devices, processing may include using the video data to produce an AR environment. In some embodiments, some or all of the processing of the video data to produce the AR environment may be performed remotely, for example, by a server in communication with the AR device over one or more networks. If the input is determined to be a privacy constrained match at 108, a security constraint 112 may be implemented to block potentially sensitive material and the input from the video capturing device 104 may continue to be monitored by the context engine 102. In some embodiments, the security constraint may provide for obscuring the potentially sensitive material before allowing the normal recording or processing of the input. For example, for an AR device, potentially sensitive material may be obscured prior to communicating the video data to a remote server for AR processing to produce an AR environment, thus preventing the potentially sensitive material from being processed by the external AR processes. In other embodiments, the security restraint may include stopping some or all of the normal recording or processing of the input. In some embodiments, the security constraint may include a combination obscuring the potentially sensitive material and stopping normal recording or processing of the input.

For example, a gamer may be playing an AR game in their home and video captures a desk in a home office, which may contain sensitive work documents. The system may block the contents of the desk, such as by pausing the stream until the desk is outside of the view of the captured video or by blurring or otherwise obscuring the surface of the desk, according to context such as geofencing of the desk, tagging such as RFID, NFC, QR code, or flagging the desk as an object identified using image recognition.

In embodiments, context may be set though manual geolocation of specific areas or geotagged boundaries may be developed by the system using machine learning techniques based on previous user behavior. In the above example, geofencing of the parent's desk may be implemented by the system in response to repeated pausing of the feed when the streaming device captures the area the desk resides.

Machine learning may be similarly applied to other cues. For example, a streamer may pause their stream whenever they manually handle their video capturing device, such that system may learn to apply a privacy filter in response to the user moving the camera (e.g., in response to a determination from the that the camera is moving based on the captured image or in response movement detected by one or more sensors such as an accelerometer or gyroscope). For a streamer who only records in a particular location, there may be particular visual cues where pauses of the stream occur when the visual cues leave the field of view. The system may learn to apply a privacy filter whenever the visual cue is lost from the video element of the streaming dataset. For example, in a cooking-centric feed which always takes place in a kitchen, visual cues may include an oven and refrigerator and these visual cues may be identified using image recognition techniques.

In embodiments, particular filters may be applied in particular situations. For example, in the above kitchen example, an audio filter may be applied when the user leaves the frame, while if the video capturing device is moved from the location it may pause the stream entirely, including video and audio. The particular filters may be machine learned based on previous user behavior. Using the above examples, the audio filter may be applied based on the user previously muting a microphone when they leave the frame of the video, and the stream may be paused entirely based on the user previously manually pausing the stream while moving the video capturing device.

Visual cues may be particular to a sensitive item rather than a location. For example, when paying a bill, the system may learn to obscure a user's signature, the entire bill, or the entire transaction according to user preferences and other context cues. Cues may be learned for particular individuals or across groups as the system identifies more global patterns of privacy contexts.

Figure 2A:
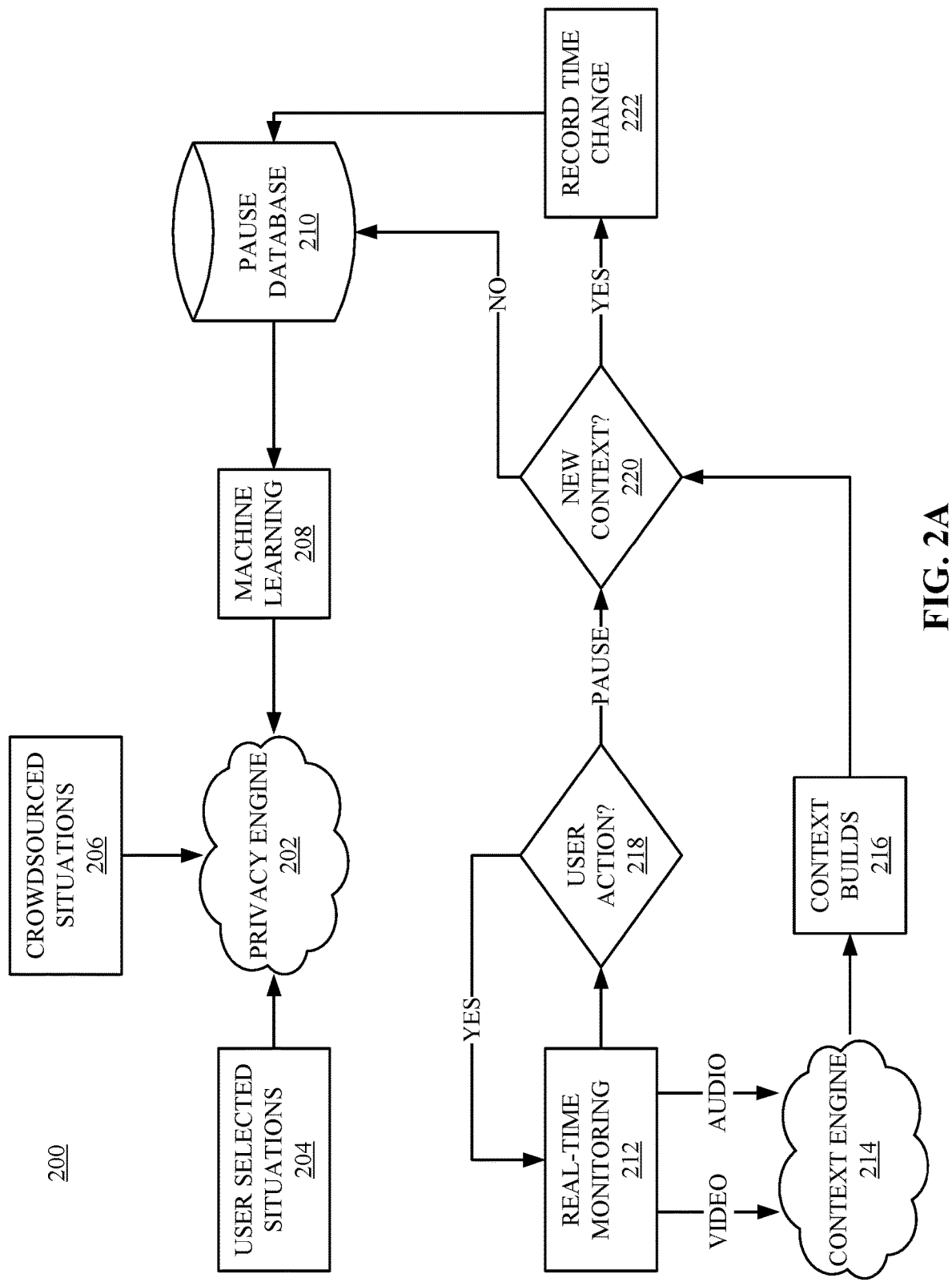
FIG. 2A depicts a flow diagram of an example operation of a streaming privacy engine, according to embodiments of the present disclosure.

Referring now to FIG. 2A, a flow diagram 200 presents an example operation of a streaming privacy engine according to some embodiments.

The privacy engine 202 incorporates information from user-tagged situations 204, global or crowdsourced situations 206, and machine learning 208. As depicted, machine learning 208 may use a pause database 210 of a user's previous pauses to develop an understanding of subjects and contexts that the user may want to protect.

The system may perform real-time monitoring of user activity 212. The real-time monitoring 212 provides data (audio, visual, temporal, etc.) to a context engine 214. The context engine 214 uses the data supplied from the activity monitoring 212 to generate context builds 216. Context builds 216 provide a framework of data (visual and audio cues, location, timing, etc.) for distinguishing user actions (and pauses) according to the user's real-world and augmented reality context.

Output from real-time monitoring 212 is continually assessed for user action 218. If the user is active, monitoring 212 continues. If a pause is detected, it is assessed for whether the detected pause is in a new context for pause 220 according to context builds 216. If the context of the pause is not new, the data may be pushed directly to pause database 210 to confirm existing pause data. If the context is a new one, the time change may be recorded 222 and then stored as a new entry in the pause database 210.

Crowdsourced data may be grouped according to input or according to audience. An example of an input group would be gamers playing AR games—the input group is gamers and the privacy protections may consider factors such as the gamers are likely playing the game in their own home (documents from work or wallet/credit cards may end up in frame) and they may be sharing their feed with others. The crowdsourced data may indicate to pause livestreaming in certain areas for this group (e.g., if a desk is in view) and to obscure common sensitive items (e.g., credit cards, bills, social security numbers, other faces). Another example of an input group may be a group of coworkers in an office, such that particular conference rooms or individual offices trigger a pause and documents trigger obfuscation of the page.

Crowdsourced data may also provide for differing privacy protections depending on the audience, e.g., for broadcast or other wide audience applications. For example, a livestream of a presentation may obscure the faces of persons in attendance at the presentation members for Audience A, but for Audience B may pause the stream entirely if the capture device moves away from a stage or podium.

Figure 2B:
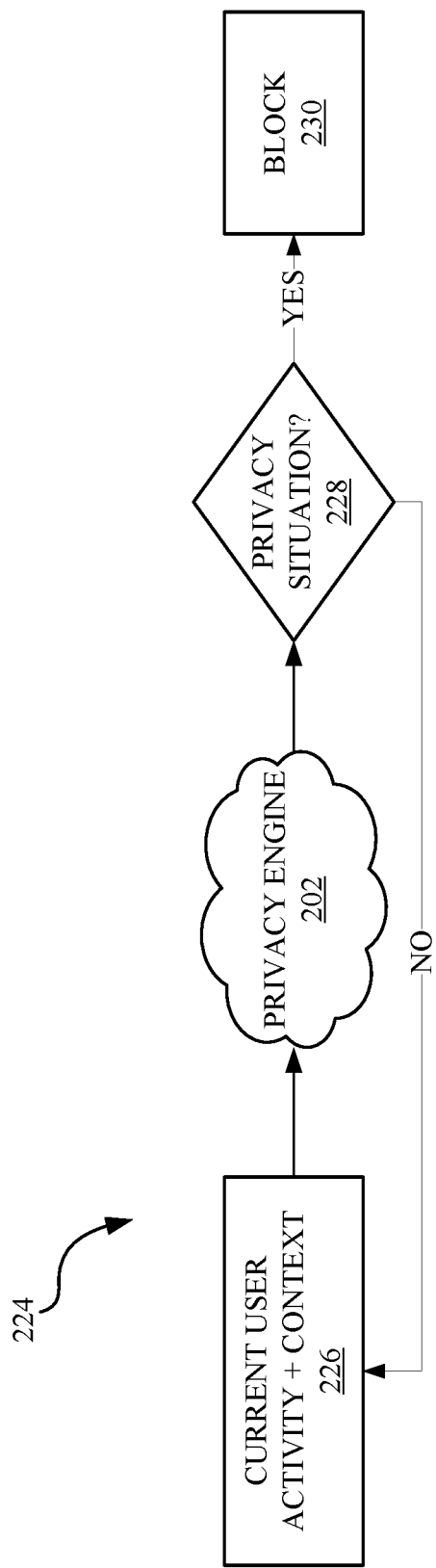
FIG. 2B depicts a flow diagram of an example execution of a privacy block using the privacy engine, according to embodiments of the present disclosure.

Referring now to FIG. 2B, a flow diagram 224 presents an example execution of a privacy block using the privacy engine 202 of FIG. 2A, according to embodiments of the present disclosure. Current user activity and context 226 is run through the privacy engine 202 to determine whether a privacy situation exists 228. If a privacy situation does not exist, assessment of current user activity and context 226 continues. If a privacy situation does exist, the system applies a block 230 on the sensitive content. Blocking may involve stopping the recording or certain processing, or may involve the application of filters, overlays, or other privacy implementation tools.

Figure 2C:
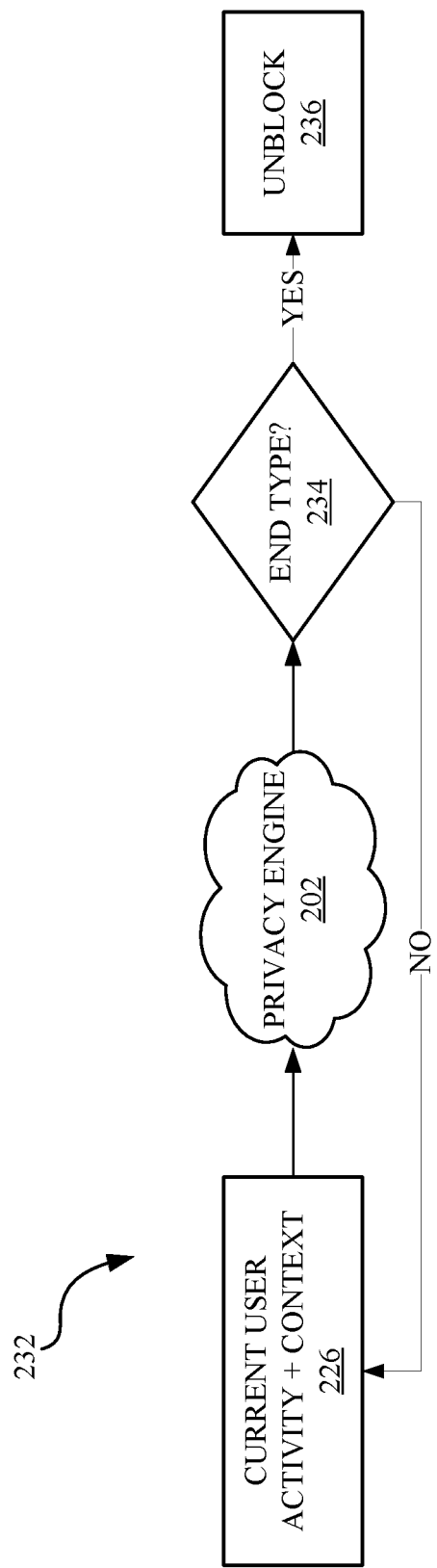
FIG. 2C depicts a flow diagram of an example execution of ending a privacy block using the privacy engine, according to embodiments of the present disclosure.

Referring now to FIG. 2C, a flow diagram 232 presents an example execution of ending a privacy block using the privacy engine 202 of FIG. 2A, according to embodiments of the present disclosure.

A block may be time based or context based (e.g., the block may be removed after a period of time or may be removed based on a change in context). Using the example of paying a bill described above, the visual cue of the bill triggers the block, and the removal of the bill from the stream may trigger the removal of the block. Alternatively, using a time-based block, the system initiates a block on the visual cue of the bill and may release the block after a certain amount of time (e.g., 1 minute) has elapsed. A time-based block may be less precise, but may require lower system overhead if monitoring is not required during the period of the block.

With a block in place, the system may continue to monitor current user activity and context 226 and run the data through the privacy engine 202. The data is assessed for an end type 234, to determine when the privacy situation no longer exists. If an end type is not detected and the privacy situation still exits, the system continues to monitor current user activity and context with the block in place. If an end type is detected, and the privacy situation is determined to no longer exist, the block may be removed 236.

Figure 3A:
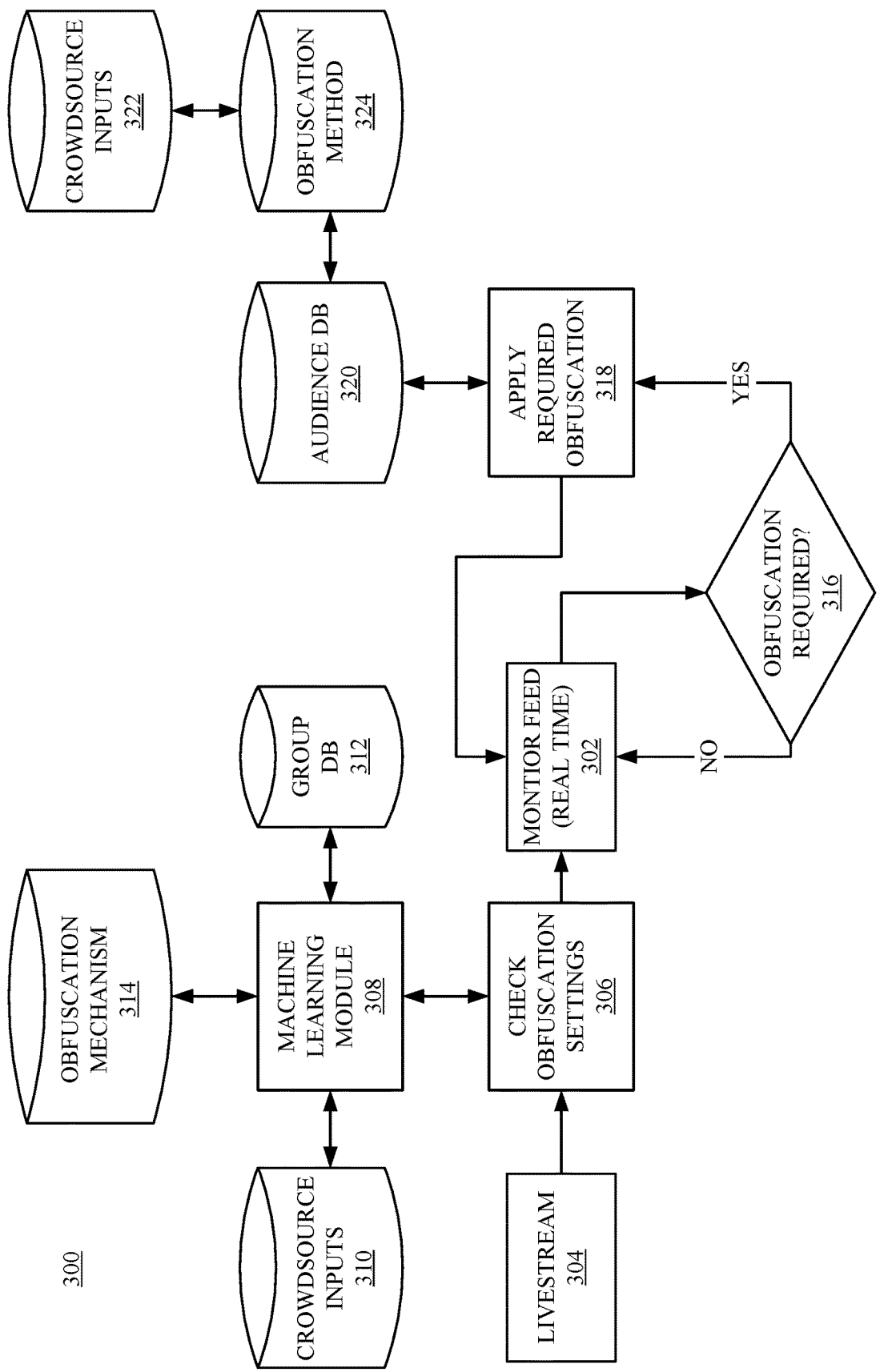
FIG. 3A depicts a flow diagram of an example execution of a reactive mode of the disclosed method and system, according to embodiments of the present disclosure.

Referring now to FIG. 3A, a flow diagram 300 of an example execution of a reactive mode of the disclosed method and system is presented, according to embodiments of the present disclosure.

The reactive mode performs real-time monitoring 302 of a livestream 304. The stream 304 is continuously run through a check of the obfuscation settings 306. The obfuscation settings check 306 is populated and maintained through a machine learning module 308 (analogous to the machine learning aspect 208 of the privacy engine 202 from FIG. 2A). Machine learning module 308 utilizes crowdsourced inputs 310 and group database information 312 to determine context and an obfuscation mechanism database 314 to establish the ideal blocking mechanism to apply in a given context. The combined data is output by the machine learning module 308 as the obfuscation settings 306.

The real-time monitoring 302 continually assesses whether obfuscation of sensitive data is required 316. If it is determined that obfuscation is not required, real-time monitoring 302 continues. If obfuscation is required, the required obfuscation method is applied 318. The required obfuscation method is stored in an audience database 320, which is populated by running crowdsource inputs 322 through an obfuscation methods database 324. The requisite obfuscation may be determined by context or audience, or some combination of factors. Once the required obfuscation has been applied 318, real-time monitoring 302 continues.

Figure 3B:
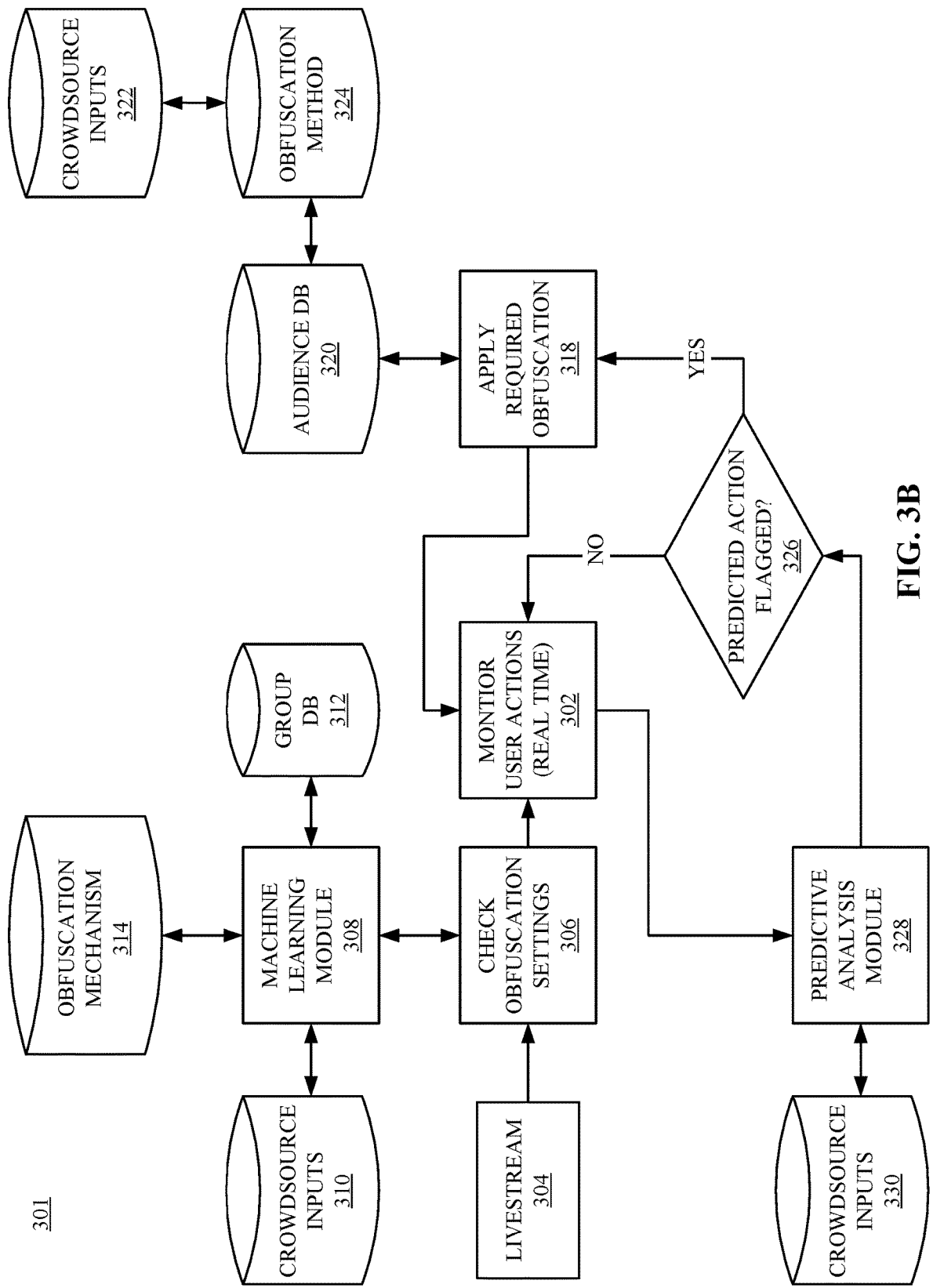
FIG. 3B depicts a flow diagram of an example execution of a predictive mode of the disclosed method and system is presented, according to embodiments of the present disclosure.

Referring now to FIG. 3B, a flow diagram 301 of an example execution of a predictive mode of the disclosed method and system is presented, according to embodiments of the present disclosure. The predictive mode reflects the reactive mode in a number of key ways.

The predictive mode performs real-time monitoring 302 of a livestream 304. The stream 304 is continuously run through a check of the obfuscation settings 306. The obfuscation settings check 306 is populated and maintained through a machine learning module 308 (analogous to the machine learning aspect 208 of the privacy engine 202 from FIG. 2A). Machine learning module 308 utilizes crowdsourced inputs 310 and group database information 312 to determine context and an obfuscation mechanism database 314 to establish the ideal blocking mechanism to apply in a given context. The combined data is output by the machine learning module 308 as the obfuscation settings 306.

Real-time monitoring 302 feeds data to a predictive analysis module 328 which predicts a future action according to crowdsource inputs 330. While the current context may not contain anything that needs to be blocked for privacy, their may be cues in the context associated with future actions that may raise a privacy concern. For example, a predicted action may include a person opening a briefcase which may contain confidential work documents, a person turning on a computer with the screen visible that potentially contains private data, or a person opening their wallet to potentially expose a driver's license or credit card. Each of these example predicted actions may be associated with cues such as a person placing their hands near the locks on a briefcase, a person placing their hand near the power button of a computer, or a person placing both hands on their wallet. Predicted actions are analyzed to determine whether a predicted action is flagged 326 for privacy protection. Predicted actions may be flagged for privacy protection in a similar manner to other privacy contexts as described herein, including using machine learning.

Like the reactive mode, if obfuscation is not determined to be required (if a flag is not detected or found), real-time monitoring 302 continues. If a flag is detected or found, obfuscation proceeds similar to the reactive mode and applies the required obfuscation 318. The required obfuscation method is stored in an audience database 320, which is populated by running crowdsource inputs 322 through an obfuscation methods database 324. Once the required obfuscation has been applied 318, real-time monitoring 302 continues. Once the obfuscation has been applied, the real-time monitoring 302 may feed data to the predictive analysis module 328 to predict a future action and removal of the obfuscation may be based on the predicted future action. For example, once the predicted future action is not flagged, the obfuscation may be removed.

While FIGS. 3A and 3B refer to livestreaming, the aspects described may further be applied to recording or otherwise processing video data for purposes other than livestreaming.

Figure 4:
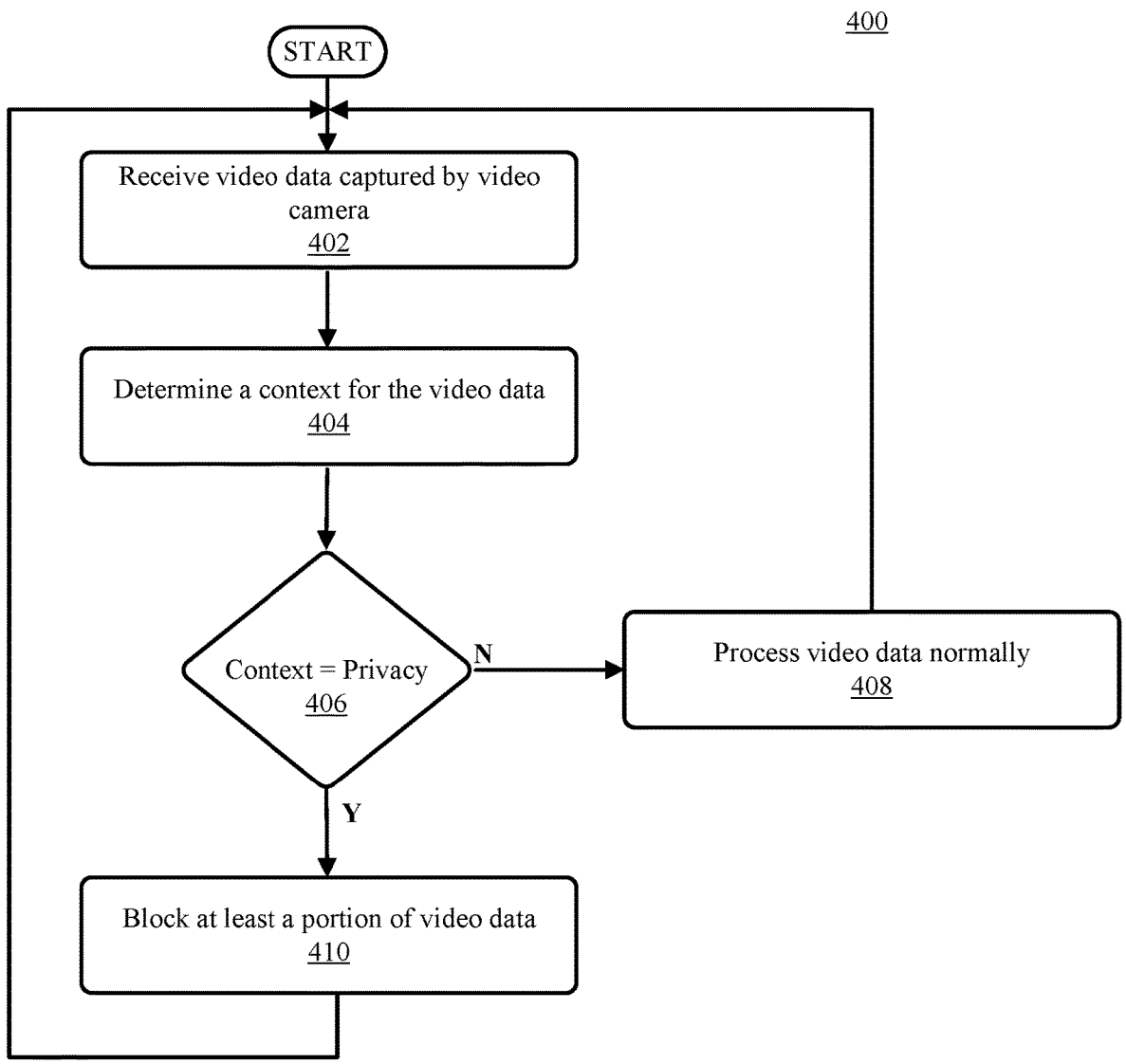
FIG. 4 depicts a flow diagram of an example method for providing video privacy, according to embodiments of the present disclosure.

Referring now to FIG. 4, a method 400 for providing video privacy is depicted. Method 400 may be performed by a computing device in communication with a video camera. Method 400 may be performed in real time as video data is being captured by the video camera for inclusion in a livestream or augmented reality environment. In some embodiments method 400 may be performed using a system such as computer system 501 described in reference to FIG. 5.

Method 400 starts with receiving video data captured by a video camera, per operation 402. The video data may be continuously captured for use in a livestream or an augmented reality environment. At operation 404, a context for the video data is determined. As described herein, determining the context may include identifying one or more objects using image recognition techniques on the video data. Determining the context may further include analyzing other types of data such as audio or location data. At operation 406, it is determined whether the context matches a privacy context. As described herein, privacy contexts may be identified using machine learning and stored in one or more databases. Privacy contexts may be based on previous user-initiated pausing of a video stream by correlating identified contexts to the user-initiated pausing as described herein. Privacy contexts may further be based on user-added privacy tags such as, for example, using an AR device interface to tag specific areas or objects. In some embodiments, a user action may be predicted based on the context for the video data and it is determined whether the predicted action matches an action flagged for privacy protection. If the context does not match a privacy context, video data is processed normally, per operation 408. As described herein, normal processing may include communicating the video data for streaming, recording the data, or performing additional processing of the data such as processing associated with creating an AR environment. If the context does match a privacy context, at least a portion of the video data is blocked, per operation 410. The blocking may be performed on subsequently captured video data as the video data used to determine the context may have already been processed normally in parallel with method 400. Regardless of whether video data is blocked or processed normally, the method returns to operation 402. If video data is blocked, the video data may continue to be blocked until a context is determined that does not match a privacy context at operation 406.

Figure 5:
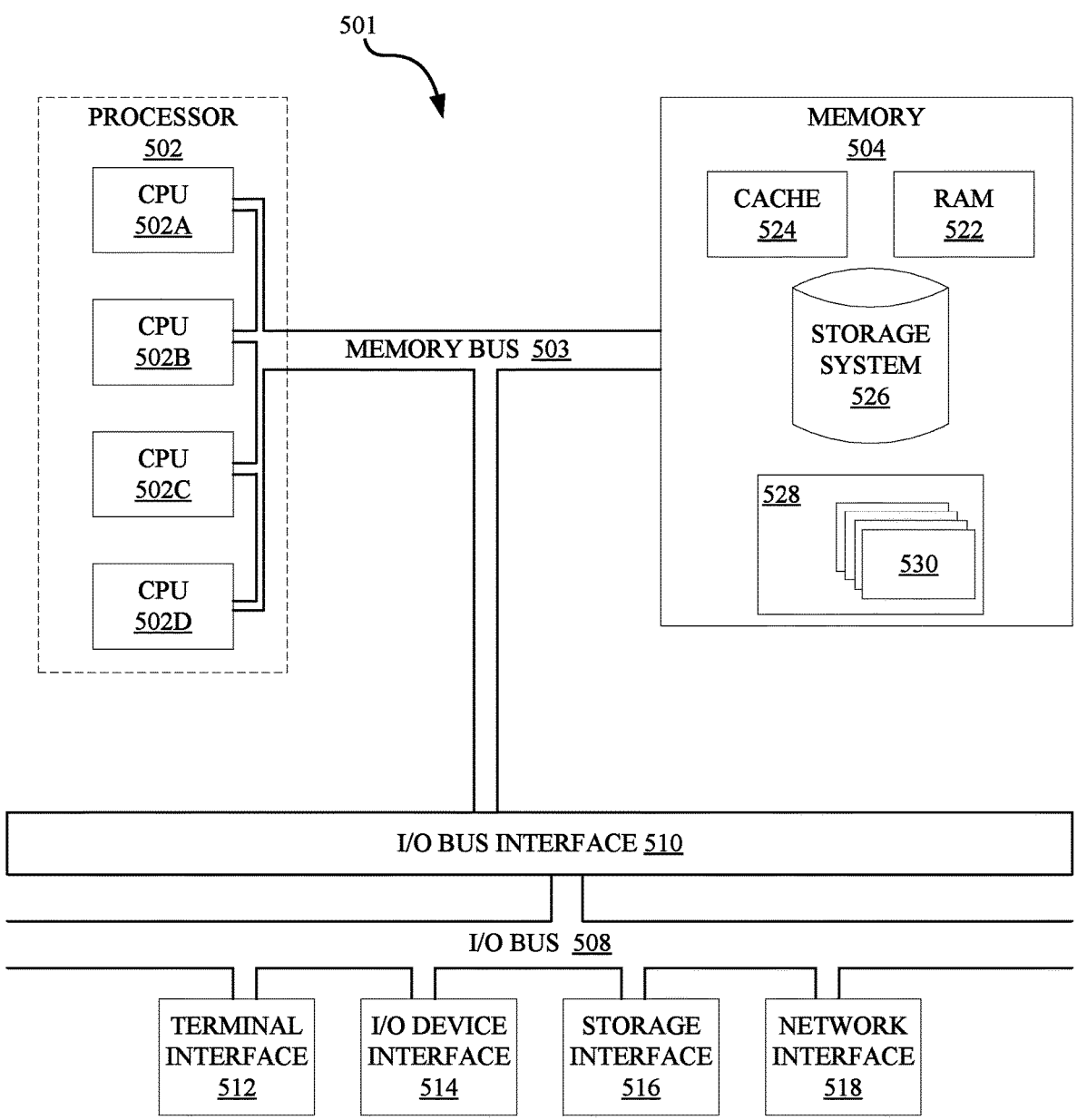
FIG. 5 depicts a high-level block diagram of an example computer system, in accordance with embodiments of the present disclosure.

Referring now to FIG. 5, shown is a high-level block diagram of an example computer system 501 that may be used in implementing one or more of the methods, tools, engines, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for providing video privacy, the method comprising:
receiving first video data captured by a video camera;
determining a first context for the first video data;
determining that the first context matches a privacy context from a set of privacy contexts identified using machine learning, wherein at least one of the privacy contexts in the set of privacy contexts is identified based on correlating identified contexts with user-initiated pausing of video streaming; and
blocking, in response to the first context matching the privacy context, at least a portion of second video data captured by the video camera subsequent to the first video data.

2. The method of claim 1, further comprising:
while blocking the at least a portion of the second video data, determining a second context for the second video data;
determining that the second context does not match a privacy context from the set of privacy contexts; and
removing the block applied to the second video data for third video data captured by the video camera subsequent to the second video data.

3. The method of claim 1, wherein determining that the first context matches the privacy context comprises:
predicting a future user action based on the first context, and determining the predicted user action matches an action flagged for privacy protection.

4. The method of claim 1, wherein at least one of the privacy contexts in the set of privacy contexts is based on a user-added privacy tag.

5. The method of claim 4, wherein the privacy tag is provided by a user with an interface of an augmented reality device.

6. The method of claim 1, wherein the video camera is part of an augmented reality device.

7. The method of claim 1, wherein blocking of at least a portion of the second video data prevents the at least a portion of the second video data from being processed by an external augmented reality process.

8. The method of claim 1, wherein the determining the context for the captured first data is based on identifying one or more objects using image recognition.

9. The method of claim 1, wherein the determining the first context for the first video data is based on audio data associated with the first video data.

10. A system for providing privacy in an augmented reality environment comprising:
a memory; and
a processor communicatively coupled to the memory, wherein the memory comprises instructions which, when executed by the processor, cause the processor to perform a method comprising:
receiving first video data captured by a video camera;
determining a first context for the first video data;
determining that the first context matches a privacy context from a set of privacy contexts identified using machine learning, wherein at least one of the privacy contexts in the set of privacy contexts is identified based on correlating identified contexts with user-initiated pausing of video streaming; and
blocking, in response to the first context matching the privacy context, at least a portion of second video data captured by the video camera subsequent to the first video data.

11. The system of claim 10, wherein determining that the first context matches the privacy context comprises:
predicting a user action based on the first context; and
determining the predicted user action matches an action flagged for privacy protection.

12. The system of claim 10, wherein the method further comprises:
  while blocking the at least a portion of the second video data, determining a second context for the second video data;
  determining that the second context does not match a privacy context from the set of privacy contexts; and
  removing the block applied to the second video data for third video data captured by the video camera subsequent to the second video data.

13. The system of claim 10, wherein blocking the at least a portion of the second video data prevents the at least a portion of the second video data from being processed by an external augmented reality process.

14. A computer program product for providing privacy in an augmented reality environment, the computer program product comprising a computer readable storage medium having program instructions embodied therein, the program instruction executable by a processor to perform a method comprising:
  receiving first video data captured by a video camera;
  determining a first context for the first video data;
  determining that the first context matches a privacy context from a set of privacy contexts identified using machine learning, wherein at least one of the privacy contexts in the set of privacy contexts is identified based on correlating identified contexts with user-initiated pausing of video streaming; and
  blocking, in response to the first context matching the privacy context, at least a portion of second video data captured by the video camera subsequent to the first video data.

15. The computer program product of claim 14, wherein determining that the first context matches the privacy context comprises:
  predicting a user action based on the first context; and
  determining the predicted user action matches an action flagged for privacy protection.

16. The computer program product of claim 14, wherein the method further comprises:
  while blocking the at least a portion of the second video data, determining a second context for the second video data;
  determining that the second context does not match a privacy context from the set of privacy contexts; and
  removing the block applied to the second video data for third video data captured by the video camera subsequent to the second video data.

17. The computer program product of claim 14, wherein blocking the at least a portion of the second video data prevents the at least a portion of the second video data from being processed by an external augmented reality process.

* * * * *